Oct. 13, 1970 R. B. WILLI 3,533,709
METHOD OF OPERATING A PUMP-TURBINE IN SPINNING RESERVE
Filed Dec. 5, 1968
2 Sheets-Sheet 1

INVENTOR.
RICHARD B. WILLI
BY Seidel & Gonda
ATTORNEYS.

United States Patent Office 3,533,709
Patented Oct. 13, 1970

3,533,709
METHOD OF OPERATING A PUMP-TURBINE IN SPINNING RESERVE
Richard B. Willi, Norristown, Pa., assignor to Baldwin-Lima-Hamilton Corporation, Philadelphia, Pa., a corporation of Delaware
Filed Dec. 5, 1968, Ser. No. 783,170
Int. Cl. F01d 17/00; F03b 15/20
U.S. Cl. 415—1                              5 Claims

ABSTRACT OF THE DISCLOSURE

A method of operating a pump-turbine in spinning reserve is provided. The runner of the pump-turbine is rotated in the turbine direction while the wicket gates are closed below the speed-no load position. Power is supplied from the main power line to the pump-turbine while the wicket gates are maintained at 19 to 22% open. Under these conditions, substantially no flow exists in the penstock. Power can be immediately supplied to the main power line by opening the wicket gates.

In power generation ssytems it is important to have generating units standing by available to pick up a load as quickly as possible and to supply power to a main power line. Such systems usually include turbines or pump-turbines. The optimum standby condition of such hydraulic machines is that in which the machine is operating with rotation in the turbine direction at normal speed with the generator connected to the main power line but developing no power. The wicket gates of the machine are usually open to pass only sufficient water to maintain normal speed. Under this condition there is no flow of electrical energy into or out of the generator. This mode of operation is known as "spinning reserve."

Should an emergency occur, the wicket gates can be opened immediately beyond the speed-no load position to supply power to the system. Conventional turbines operate satisfactorily in the spinning reserve mode as described above. However, reversible pump-turbines, particularly those adapted to high head operation, do not. These pump-turbines tend to be extremely noisy and are subjected to cyclical forces of high magnitude as each runner blade passes the wake of each wicket gate.

Another conventional method that has been used on pump-turbines as a spinning reserve mode consists of operating pump-turbines in the turbine direction of rotation with the generator connected to the line. The runner of the pump-turbine will thus be rotated with the wicket gates fully closed. Air pressure is supplied inside of the wicket gates to depress tailwater below the elevation of the runner so it is spinning in air. This spinning reserve mode has several objections. In high head applications leakage water escaping through the wicket gate clearances from the penstock must be drained away so that it cannot collect in the space between the wicket gates and the runner. This leakage becomes so great with high heads as to be difficult to remove.

Furthermore, as the wicket gates are opened when a demand for power occurs in an emergency and before power can be delivered to the line, an extremely high power must be supplied to the pump-turbine from the line for a short period of time as the gates open from closed position to the speed-no load position. Such an additional demand for power at a moment when, due to an emergency more power input to the line is needed, could result in a complete breakdown of the system.

It is an object of the present invention to overcome the deficiencies of prior art methods of operating pump-turbines in spinning reserve.

It is another object of the present invention to operate a pump-turbine in a spinning reserve mode wherein substantially no flow exists in the penstock.

It is a further object of the present invention to provide a method of operating a pump-turbine in spinning reserve wherein the wicket gates are maintained at a 19 to 22% open position and power is supplied to the pump-turbine which is operated in the turbine mode.

It is still another object of the present invention to provide a method of operating a pump-turbine in spinning reserve wherein the pump-turbine is operated in the turbine mode to generate a head which is substantially equal to that imposed by the upper reservoir.

Other objects will appear hereinafter.

The above and other obbjects are accomplished by providing the method of the present invention. The pump-turbine is operated in the turbine mode so that the pump-turbine will act as a pump. The operation of a pump turbine in this manner is fully described in U.S. Pat. 3,372,645. The optimum condition insofar as noise and cyclic forces are concerned are obtained by providing a gate opening of approximately 19 to 22%. In this condition, substantially no flow will exist in the penstock. The head being generated by the pump-turbine is substantially equal to that imposed by the upper reservoir. Some power must be supplied from the main power line to the generator-motor to operate the pump-turbine in the turbine mode at normal speed. However, power can be immediately supplied to the main power line by opening the wicket gates.

For the purpose of illustrating the invention there is shown in the drawings a form which is presently preferred; it being understood, reference should be made to the appended claims, rather than to the foregoing specification as indicating the scope of the invention.

Figure 1:
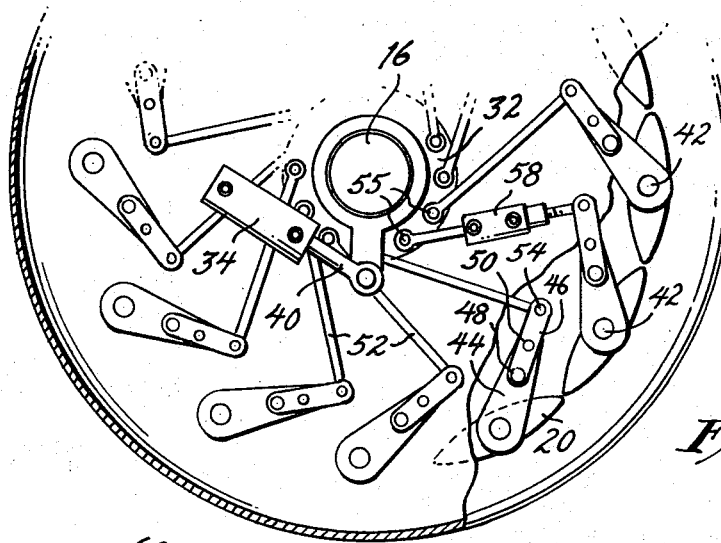
FIG. 1 is a partial plan view showing the means for adjusting the wicket gates of a pump-turbine.
Figure 3:
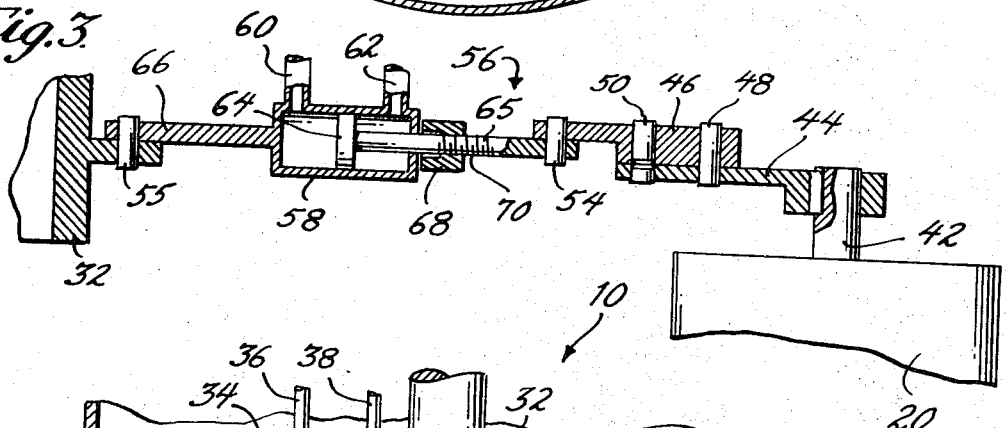
FIG. 3 is a detailed section view of the means for individually adjusting wicket gates of the pump-turbine.
Figure 2:
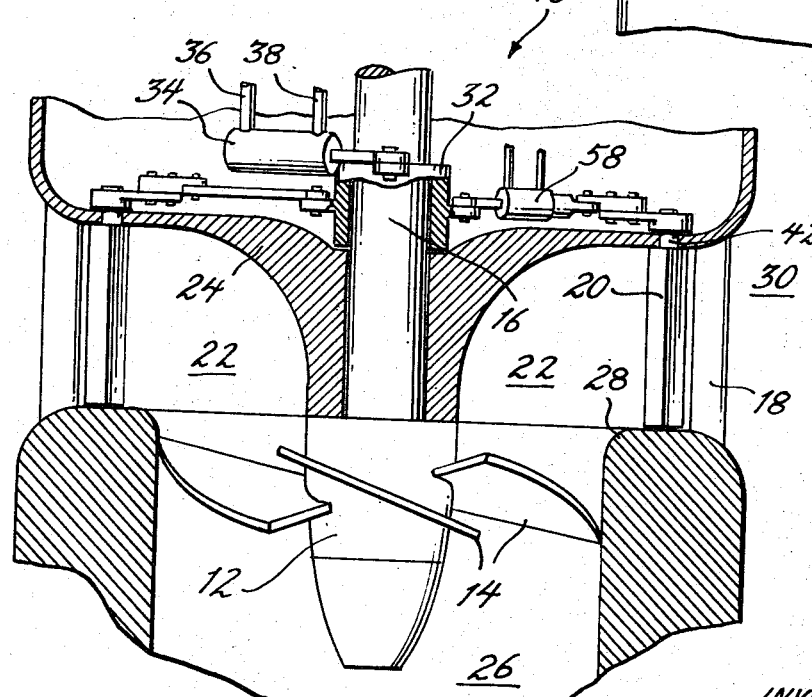
FIG. 2 is a vertical section view of a pump-turbine suitable for use in the method of the present invention.

Referring now to the drawings in detail wherein like reference numerals indicate like elements throughout the several views, there is shown in FIGS. 1–3, a pump-turbine generally indicated by the reference numeral 10. While the pump-turbine shown is of the Kaplan type, it is to be understood that this invention is not limited to any particular type of pump-turbine.

The pump-turbine 10 includes a runner 12 having a plurality of runner blades 14 secured thereto. The angle of the runner blades may be varied in a well known manner in order to permit the hydraulic machine to operate either as a pump or as a turbine. The runner 12 is supported by a main shaft 16.

The pump turbine 10 has a plurality of stationary stay vanes 18. A plurality of wicket gates 20 are provided adjacent the stay vanes 18. A transition space 22 exists between the runner blades 14 and the wicket gates 20. The transition space 22 is also bounded by the head cover 24 and the uppermost end 28 of the draft tube 26. An inlet or penstock 30 is provided to permit water to flow through the stay vanes, wicket gates, transition space, past the runner blades 14 and out through the draft tube 26. When the water flows in such direction, the hydraulic machine will be operating in the turbine mode. The mode of operation of the hydraulic machine 10 can be reversed to pump water up from the draft tube 26 through the transition space 22 and outwardly through the wicket gates 20 and stay vanes 18 into the penstock 30.

A conventional shifting ring 32 is provided for varying the openings of the wicket gates 20. A main cylinder 34 is provided for actuating the shifting ring 32. Inlet and outlet conduits 36 and 38, respectively, are provided for motivating the main cylinder 34. A piston (not shown) is provided in the main cylinder 34 and has a piston rod 40 secured thereto. Movement of the piston rod 40 controls the opening of the wicket gates 20 in a well known manner.

The wicket gates 20 are mounted on stems 42. A coupling 44 is secured to the stems 42 and adapted to rotate the same. The coupling 44 is connected to a lever 46 by a pivot pin 48 and a shear pin 50. The shear pin 50 is provided so that should an obstruction prevent movement of the wicket gates, the pin 50 will shear thus preventing damage to the operating mechanism or the wicket gates. The lever 46 is connected to an arm 52 by a pivot pin 54. The arm 52 is also connected to the stay ring 32 by means of a pivot pin 55.

As described above, the operating mechanism for the wicket gates 20 is conventional. However, selected operating mechanisms may be individually operated in order to provide for finer control of the wicket gates of the pump-turbine 10. Hence, selected ones of the wicket gates 20 are provided with extendable arms 56. Identical structure with respect to the conventional wicket gate operating mechanism will be denoted by the same reference numeral.

The extendable arms 56 include a link 66 secured to the stay ring 32 by pivot pin 55. The link 66 has a cylinder 58 integral or secured thereto in any desired manner. The cylinder 58 has an inlet port 60 and an outlet port 62 secured thereto. A piston 64 having a rod 65 integral therewith is in the cylinder 58. The rod 65 is connected to the lever 46 by a pivot pin 54. The rod 65 has a threaded portion 70 external to the cylinder 58 and adjustable stop 68 is threadedly secured to the piston rod 65. The stop 68 will prevent undesired excessive movement of the rod 65.

By providing extendable arms 56 for several of the wicket gates 20 it is possible to accurately control the position of the various wicket gates to provide an overall close control of the operating characteristics of the pump-turbine. On the accompanying diagram set forth in FIG. 4, the absicca represents the percent of wicket gate opening and the ordinate represents the power received from or supplied to the main power line by the pump-turbine 10. Line A, shows the position of the wicket gates in the conventional spinning reserve position. Curve B shows relationship between gate opening and power transfer from the main power line to the motor-generator of the pump-turbine. Curve C shows the relation of discharge or water flow with respect to the gate opening. In the normal spinning reserve mode, shown by line A, it will be noted that, at this gate opening, there is no transfer of power from the line to the motor-generator, since Curve C passes through zero. Curve C shows that the water flow or discharge is in the turbine direction.

It is established, as described in U.S. Pat. 3,372,645, that a pump-turbine will act as a pump, even through rotating in the turbine direction, if the gates are closed somewhat below the speed-no load position indicated by line A. The preferable condition insofar as noise and cyclic forces are concerned, exists wherein the spinning reserve mode is obtained by operating the pump-turbine at a smaller gate opening in the range between lines D and E. Under this condition, substantially no flow exists in the penstock. The head being generated by the pump-turbine is substantially equal to that imposed by the upper reservoir. It is necessary that some power be supplied from the line to the generator-motor, in order to drive the pump-turbine at a normal speed under this mode. Power can be supplied immediately to the line as in the normal spinning reserve mode by opening the wicket gates.

Accordingly, the spinning reserve condition of the present invention is wherein the wicket gates are 19–22 percent open and the pump-turbine 10 is operated in the generating mode. In this condition, noise and cyclic forces of the pump-turbine 10 are minimized and power can be immediately supplied to the main power line by rapidly opering the wicket gates.

Figure 4:
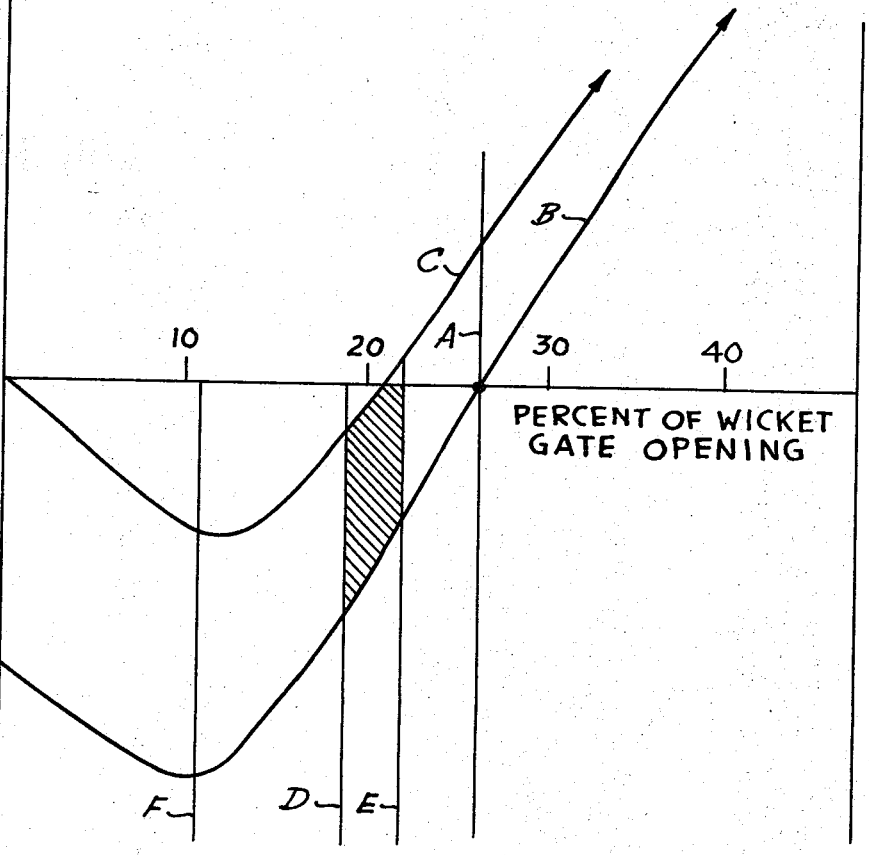
FIG. 4 is a diagram illustrating the operating characteristics of a pump-turbine operated in accordance with the present invention.

The provision of individual wicket gate control for selective wicket gates facilitates operation of the pump-turbine between lines D and E shown in diagram in FIG. 4.

The present invention may be embodied in other specific forms without departing from the spirit or essential attributes thereof, and accordingly, reference should be made to the appended claims, rather than to the foregoing specification as indicating the scope of the invention.

I claim:

1. A method of operating a pump-turbine in spinning reserve comprising the steps of operating in a pump-turbine in the turbine mode, generating a head substantially equal to the head resulting from the upper reservoir, maintaining the wicket gates at a gate opening of approximately 20 percent, supplying sufficient power to drive the turbine to provide substantially no flow in the penstock of the pump-turbine, whereby power can be supplied to the main power line as soon as the wicket gates are opened to a substantial open gate position.

2. A method as set forth in claim 1 comprising the steps of individually controlling the positioning of at least one wicket gate independent of the operation of the remaining wicket gates of the pump-turbine.

3. A method as set forth in claim 1 including varying the gate opening of the wicket gates between 19–22 percent of the open gate position.

4. A method of operating a pump-turbine in spinning reserve including the steps of providing substantially no flow in the penstock of the pump-turbine, operating the pump-turbine in the turbine mode, generating a head substantially equal to the head resulting from the upper reservoir, maintaining the wicket gates at a gate opening of approximately 19–22 percent of the full wicket gate opening, supplying sufficient power to drive the pump-turbine so that power can be supplied by the pump-turbine as soon as the wicket gates are opened to a substantial open gate position.

5. A method as set forth in claim 4 including the step of providing for individualy positioning of various of the wicket gates independent of the main wicket gate positioning means.

References Cited

UNITED STATES PATENTS

| | | | |
|---|---|---|---|
| 1,919,376 | 7/1933 | Moody | 415—500 |
| 3,007,628 | 11/1961 | Nichols | 415—500 |
| 3,236,497 | 2/1966 | Wycliffe | 415—500 |
| 3,264,485 | 8/1966 | Naganuma et al. | 415—1 |
| 3,275,293 | 9/1966 | Hosogai et al. | 103—97 |
| 3,309,057 | 3/1967 | Tonooka | 415—1 |
| 3,372,645 | 3/1968 | Willi | 415—500 |
| 3,403,888 | 10/1968 | Hartland | 415—1 |

FOREIGN PATENTS

| | | |
|---|---|---|
| 1,020,383 | 2/1966 | Great Britain. |

HENRY F. RADUAZO, Primary Examiner

U.S. Cl. X.R.

415—160, 500